(12) United States Patent
Lettkeman et al.

(10) Patent No.: US 7,608,347 B2
(45) Date of Patent: *Oct. 27, 2009

(54) MODIFIERS FOR GYPSUM SLURRIES AND METHOD OF USING THEM

(75) Inventors: Dennis M. Lettkeman, Watonga, OK (US); Michael P. Shake, Johnsburg, IL (US); Qingxia Liu, Vernon Hills, IL (US); John W. Wilson, Fairview, OK (US); Brian Randall, Fairview, OK (US); David R. Blackburn, Barrington, IL (US)

(73) Assignee: United States Gypsum Company, Chicago, IL (US)

( * ) Notice: Subject to any disclaimer, the term of this patent is extended or adjusted under 35 U.S.C. 154(b) by 205 days.

This patent is subject to a terminal disclaimer.

(21) Appl. No.: 11/450,068

(22) Filed: Jun. 9, 2006

(65) Prior Publication Data

US 2006/0278134 A1 Dec. 14, 2006

Related U.S. Application Data

(63) Continuation-in-part of application No. 11/152,317, filed on Jun. 14, 2005.

(51) Int. Cl.
*B32B 13/00* (2006.01)
(52) U.S. Cl. ........................ 428/703; 106/772; 106/773; 106/774; 106/776; 106/778
(58) Field of Classification Search .................. 428/703; 106/772, 773, 774, 776, 778
See application file for complete search history.

(56) References Cited

U.S. PATENT DOCUMENTS

| | | | |
|---|---|---|---|
| 4,028,125 A | 6/1977 | Martin | |
| 4,202,857 A | 5/1980 | Lowe | |
| 4,238,239 A | 12/1980 | Brown | |
| 4,341,560 A | 7/1982 | Saito et al. | |
| 4,561,986 A | 12/1985 | Villa et al. | |
| 4,666,971 A | 5/1987 | Greenhalgh | |
| 4,814,014 A | 3/1989 | Arfaei | |
| 4,818,288 A | 4/1989 | Aignesberger et al. | |
| 4,927,463 A | 5/1990 | Kloetzer et al. | |
| 4,960,465 A | 10/1990 | Arfaei | |
| 5,109,030 A | 4/1992 | Chao et al. | |
| 5,118,751 A | 6/1992 | Schulze et al. | |
| 5,223,036 A | 6/1993 | Koyata et al. | |
| 5,362,323 A | 11/1994 | Koyata et al. | |
| 5,369,198 A | 11/1994 | Albrecht et al. | |
| 5,387,626 A | 2/1995 | Bohme-Kovac et al. | |
| 5,393,343 A | 2/1995 | Darwin et al. | |
| 5,401,798 A | 3/1995 | Rasp et al. | |
| 5,424,099 A | 6/1995 | Stewart et al. | |
| 5,556,460 A | 9/1996 | Berke et al. | |
| 5,614,017 A | 3/1997 | Shawl | |
| 5,643,978 A | 7/1997 | Darwin et al. | |
| 5,661,206 A | 8/1997 | Tanaka et al. | |
| 5,670,578 A | 9/1997 | Shawl | |
| 5,685,903 A | 11/1997 | Stav et al. | |
| 5,703,174 A | 12/1997 | Arfaei et al. | |
| 5,725,656 A | 3/1998 | Shimanovich et al. | |
| 5,725,657 A | 3/1998 | Darwin et al. | |
| 5,739,212 A | 4/1998 | Wutz et al. | |
| 5,779,786 A | 7/1998 | Patel | |
| 5,798,425 A | 8/1998 | Albrecht et al. | |
| 5,834,576 A | 11/1998 | Nagano et al. | |
| 5,858,083 A | 1/1999 | Stav et al. | |
| 5,925,184 A | 7/1999 | Hirata et al. | |
| 5,985,989 A | 11/1999 | Shawl et al. | |
| 6,034,208 A | 3/2000 | McDaniel et al. | |
| 6,043,329 A | 3/2000 | Lepori et al. | |
| 6,150,437 A | 11/2000 | Wutz et al. | |
| 6,166,112 A | 12/2000 | Hirata et al. | |
| 6,187,887 B1 | 2/2001 | Albrecht et al. | |
| 6,211,317 B1 | 4/2001 | Albrecht et al. | |
| 6,264,739 B1 | 7/2001 | Yamoto et al. | |
| 6,281,307 B1 | 8/2001 | Muhlebach et al. | |
| 6,294,015 B1 | 9/2001 | Yamashita et al. | |
| 6,376,581 B1 | 4/2002 | Tanaka et al. | |
| 6,527,850 B2 | 3/2003 | Schwartz et al. | |
| 6,620,879 B1 | 9/2003 | Albrecht et al. | |
| 6,800,129 B2 | 10/2004 | Jardine et al. | |
| 6,852,159 B2 | 2/2005 | Kinoshita et al. | |
| 6,869,988 B2 | 3/2005 | Schwartz et al. | |
| 7,070,648 B1 | 7/2006 | Schwartz et al. | |
| 7,105,587 B2 * | 9/2006 | Tagge et al. ................... 524/3 | |
| 2003/0019401 A1 | 1/2003 | Schwartz et al. | |
| 2003/0127026 A1 | 7/2003 | Anderson et al. | |
| 2003/0167973 A1 | 9/2003 | Peev et al. | |

(Continued)

FOREIGN PATENT DOCUMENTS

EP 0644165 3/1995

(Continued)

*Primary Examiner*—Paul Marcantoni
(74) *Attorney, Agent, or Firm*—Greer, Burns & Crain, Ltd.; David F. Janci, Esq.; Pradip Sahu, Esq.

(57) ABSTRACT

An improved gypsum slurry that includes water, calcium sulfate hemihydrate, a polycarboxylate dispersant and a modifier. The modifier is chemically configured to improve the efficacy of the polycarboxylate dispersant. Preferred modifiers include cement, lime, slaked lime, soda ash, carbonates, silicates and phosphates.

8 Claims, No Drawings

U.S. PATENT DOCUMENTS

| | | |
|---|---|---|
| 2004/0045481 A1 | 3/2004 | Sethuraman et al. |
| 2004/0072939 A1 | 4/2004 | Cornman et al. |
| 2004/0149172 A1 | 8/2004 | Jardine et al. |
| 2004/0149174 A1 | 8/2004 | Farrington et al. |
| 2004/0170873 A1 | 9/2004 | Smith |
| 2004/0198873 A1 | 10/2004 | Bury et al. |
| 2004/0211342 A1 | 10/2004 | Sprouts et al. |
| 2005/0045069 A1 | 3/2005 | McCarthy et al. |
| 2006/0278135 A1* | 12/2006 | Liu et al. |
| 2006/0280899 A1* | 12/2006 | Liu et al. |

FOREIGN PATENT DOCUMENTS

| | | |
|---|---|---|
| EP | 0725044 | 8/1996 |
| JP | 56045857 | 4/1981 |
| JP | 59025876 | 2/1984 |
| JP | 61040861 | 2/1986 |
| WO | WO 9533698 | 12/1995 |
| WO | WO 0181263 | 11/2001 |
| WO | WO 03/082765 | 10/2003 |
| WO | WO 03/082766 | 10/2003 |

* cited by examiner

MODIFIERS FOR GYPSUM SLURRIES AND METHOD OF USING THEM

CROSS REFERENCES TO RELATED APPLICATIONS

This application is a continuation-in-part of U.S. Ser. No. 11/152,317, entitled "Modifiers for Gypsum Slurries and Methods of Using Them", filed Jun. 14, 2005, now abandoned, and herein incorporated by reference.

This application is related to U.S. Ser. No. 11/152,661, entitled "Fast Drying Wallboard", now U.S. Pat. No. 7,572,328; U.S. Ser. No. 11/152,324, entitled "High Strength Flooring Compositions", now U.S. Pat. No. 7,504,165; U.S. Ser. No. 11/152,418, entitled "Gypsum Products Utilizing a Two-Repeating Unit System and Process for Making Them", now abandoned; U.S. Ser. No. 11/152,323, entitled "Method of Making a Gypsum Slurry with Modifiers and Dispersants", now abandoned; and U.S. Ser. No. 11/152,404, entitled, "Effective Use of Dispersants in Wallboard Containing Foam", now abandoned; all filed Jun. 14, 2005 and all herein incorporated by reference.

This application is further related to U.S. Ser. No. 11/449,924, entitled "Gypsum Products Utilizing a Two-Repeating Unit System and Process for Making Them"; U.S. Ser. No.11/450,086, entitled "Method of Making a Gypsum Slurry with Modifiers and Dispersants", now U.S. Pat. No. 7,572,329; and U.S. Ser. No. 11/450,122, entitled, "Effective Use of Dispersants in Wallboard Containing Foam", now U.S. Pat. No. 7,544,242 all filed Jun. 9, 2006 and all herein incorporated by reference.

BACKGROUND

This invention relates to improved gypsum products. More specifically, it relates to an improved gypsum slurry that is flowable at low water concentrations, with less expense and less retardive effects than using carboxylate dispersants alone.

Gypsum products are commonly used as building materials for many reasons, such as wallboard. Wallboard sheets are easily joined together to make continuous walls of any size and shape. They are easily patched and have fire and sound proofing properties. Decorative finishes, such as wallpaper or paint readily adhere to plaster or wallboard surfaces to allow for a large variety of decorating options.

The strength of gypsum products made from full density slurries is inversely proportional to the amount of water used in their manufacture. Some of the water that is added to the gypsum slurry is used to hydrate the calcined gypsum, also known as calcium sulfate hemihydrate, to form an interlocking matrix of calcium sulfate dihydrate crystals. Excess water evaporates or is driven off in a kiln, leaving voids in the matrix once occupied by the water. Where large amounts of water were used to fluidize the gypsum slurry, more and larger voids remain in the product when it is completely dry. These voids decrease the product density and strength in the finished product.

Attempts have been made to reduce the amount of water used to make a fluid slurry using dispersants. Polycarboxylate superplasticizers are very effective in allowing water reduction and the resultant increase in product strength, however, there are disadvantages known to be associated with use of large doses of polycarboxylate dispersants. These materials are relatively expensive. When used in large doses, polycarboxylate dispersants can be one of the single, most expensive additives in making gypsum products. The high price of this component can overcome the narrow margins afforded these products in a highly competitive marketplace.

Another disadvantage associated with polycarboxylate dispersants is the retardation of the setting reaction. Gypsum board is made on high speed production lines where the slurry is mixed, poured, shaped and dried in a matter of minutes. The board must be able to hold its shape to be moved from one conveyor line to another to put the board into the kiln. Damage can occur if the boards have not attained a minimum green strength by the time they are stacked and wrapped for shipping. If the board line has to be slowed down because the board is not sufficiently set to move on to the next step in the process, production costs are driven up, resulting in an economically uncompetitive product.

Lime has been used in plaster to improve its workability. It gives the plaster a good "feel", imparting a smoothness and plasticity that makes it easy to trowel. Since it is alkaline, lime acts to make some retarders more efficient, increasing the open time of the plaster. Finally, the lime present in the plaster oxidizes over time to form calcium carbonate which gives the surface a hardness beyond that obtainable with plaster alone.

U.S. Pat. No. 5,718,759 teaches the addition of silicates to mixtures of beta-calcined gypsum and cement. In the examples, lignosulfates or naphthalene sulfonates are used as water-reducing agents. The addition of pozzolanic materials, including silicates, is credited with reducing expansion due to the formation of ettringite. The composition is suggested for use in building materials, such as backer boards, floor underlayments, road patching materials fire-stopping materials and fiberboard.

Luongo, in U.S. Pat. No. 6,391,958, teaches a novel wallboard composition combining gypsum with sodium silicates and a synthetic, cross-linking binder. Vinyl acetate polymers were the preferred cross-linking binder. The addition of sodium silicates reduces the amount of calcined gypsum that is needed to make a given number of panels. The weight of the building panel is reduced, making it easier for workers to move the panels before and during installations.

A number of polycarboxylate dispersants are disclosed in U.S. Pat. No. 6,005,040. In one embodiment of the invention, a water soluble polymer is disclosed having one repeating unit of the formula:

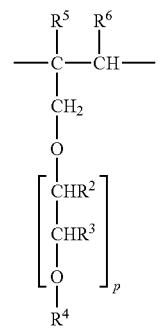

where P is an integer from 1-10 and $R^2$, $R^3$, $R^4$, $R^5$ and $R^6$ are not all hydrogens, but any one of them can be a hydrogen. The polymer also includes a water-soluble repeating unit selected from a group containing acrylic acid and methacrylic acid, among others. The polymer is used in an unfired, ceramic precursor material. Other polymers are disclosed in the application, including some for use in the core forming process of gypsum wallboard or the preparation of gypsum slurries.

The prior art has failed to adequately address the problem of improving the efficacy of a given polycarboxylate dispersant. Improving the efficacy of a dispersant would reduce the cost of the dispersant while maintaining the reasonable price of gypsum products.

Thus, there is a need in the art to reduce the dosage of dispersants used in a gypsum slurry while maintaining flowability of the slurry. Reduction in dispersant use would result in saving of costs spent on the dispersant and would reduce adverse side effects, such as set retardation.

SUMMARY OF THE INVENTION

These and other problems are improved by this invention which includes the addition of an efficacy modifier to a gypsum slurry that increases the fluidity of slurries made with polycarboxylate dispersant. When one or more of the modifiers is used, less dispersant is required to achieve a given fluidity resulting in lower dispersant cost and generally less retardation.

More specifically, the invention relates to an improved gypsum slurry, that includes water, calcium sulfate hemihydrate, a polycarboxylate dispersant and a modifier. The modifier is chemically configured to improve the efficacy of the polycarboxylate dispersant. Preferred modifiers include cement, lime, slaked lime, soda ash, carbonates, silicates, phosphonates and phosphates.

In another embodiment of this invention, a gypsum panel is made from at least one facing sheet and a core made from the improved gypsum slurry. Yet another aspect of this invention is a method of making the gypsum slurry that includes selecting a modifier, mixing the modifier with a polycarboxylate dispersant and adding the calcium sulfate hemihydrate.

Use of the modifiers herein described improves the efficacy of the dispersant in fluidizing the gypsum slurry. This allows less of the dispersant to be used and still obtain high flowability in low water slurries for strength. Polycarboxylate dispersants are often one of the most expensive components in products that use them. Using lower dosages of the dispersant reduces the cost so that a competitively priced gypsum product can be made.

Lowering the concentration of the dispersant also minimizes the disadvantageous effects of the polycarboxylate dispersant. At a lower dose, there is less retardation of the setting reactions. Less set accelerator would be needed in the product to overcome the effects of set retardation, reducing the price paid for the accelerator.

Instead of or in addition to reducing the dispersant dosage, the improved efficacy of the dispersant can also be used to reduce the amount of water used to make the gypsum slurry. The manufacturing process can be made more fuel efficient, conserving fossil fuels and realizing the cost savings. Fuel savings can be based on either reduced kiln temperatures or shorter residence time in the kiln.

DETAILED DESCRIPTION OF THE INVENTION

The gypsum slurry of this invention is made using water, calcined gypsum, a polycarboxylate dispersant and a modifier. Although the benefits of this invention are most clear when used in a slurry for a high strength product, it can be used with any slurry using a polycarboxylate, even those that already utilize low doses of polycarboxylate dispersant.

Any calcined gypsum or stucco is useful in this slurry. It has unexpectedly been discovered that some gypsum sources are more responsive to the dispersant and the modifier than other sources. Laboratory tests indicate that gypsums from different geographical areas contain different salts and impurities. While not wishing to be bound by theory, it is believed that the salts present in the gypsum influence the fluidity in the slurry.

Reduction in the amount of water used to make the slurry is achieved by the addition of a polycarboxylate dispersant. The dispersant attaches itself to the calcium sulfate, then charged groups on the backbone and the side chains on the branches of the polymer repel each other, causing the gypsum particles to spread out and flow easily. When the slurry flows more easily, the amount of water can be reduced and still obtain a flowable fluid. In general, reduction in water results in increased product strength and lower drying costs.

Any polycarboxylate dispersant that is useful for improving fluidity in gypsum may be used in the slurry of this invention. A number of polycarboxylate dispersants, particularly polycarboxylic ethers, are preferred types of dispersants. One of the preferred class of dispersants used in the slurry includes two repeating units. It is described further in co-pending U.S. Ser. No. 11/449,924, entitled "Gypsum Products Utilizing a Two-Repeating Unit System and Process for Making Them", previously incorporated by reference. These dispersants are products of Degussa Construction Polymers, GmbH (Trostberg Germany) and are supplied by Degussa Corp. (Kennesaw, Ga.) (hereafter "Degussa") and are hereafter referenced as the "PCE211-Type Dispersants".

The first repeating unit is an olefinic unsaturated monocarboxylic acid repeating unit, an ester or salt thereof, or an olefinic unsaturated sulphuric acid repeating unit or a salt thereof. Preferred first repeating units include acrylic acid or methacrylic acid. Mono- or divalent salts are suitable in place of the hydrogen of the acid group. The hydrogen can also be replaced by a hydrocarbon group to form the ester.

The second repeating unit satisfies Formula I,

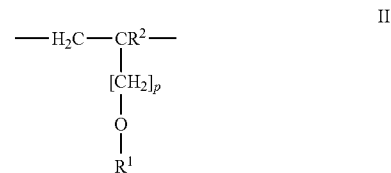

where $R^1$ is an alkenyl group of Formula I

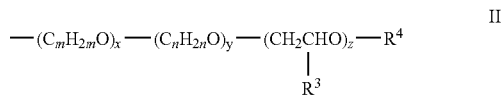

Referring to Formula I, the alkenyl repeating unit optionally includes a $C_1$ to $C_3$ alkyl group between the polymer backbone and the ether linkage. The value of p is an integer from 0-3, inclusive. Preferably, p is either 0 or 1. $R_2$ is either a hydrogen atom or an aliphatic $C_1$ to $C_5$ hydrocarbon group, which may be linear, branched, saturated or unsaturated.

The polyether group of Formula II contains multiple $C_2$-$C_4$ alkyl groups, including at least two different alkyl groups, connected by oxygen atoms. M and n are integers from 2 to 4, inclusive, preferably, at least one of m and n is 2. X and y are integers from 55 to 350, inclusive. The value of z is from 0 to 200, inclusive. $R^3$ is a non-substituted or substituted aryl group and preferably phenyl. $R^4$ is hydrogen or an aliphatic $C_1$ to $C_{20}$ hydrocarbon group, a cycloaliphatic $C_5$ to $C_8$ hydrocarbon group, a substituted $C_6$ to $C_{14}$ aryl group or a group conforming to at least one of Formula III(a), III(b) and III(c).

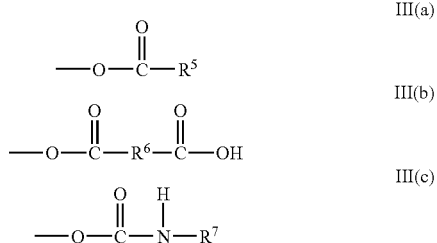

In the above formulas, $R^5$ and $R^7$, independently of each other, represent an alkyl, aryl, aralkyl or alkylaryl group. $R^6$ is a bivalent alkyl, aryl, aralkyl or alkylaryl group.

A particularly useful dispersant of the PCE211-Type Dispersants is designated PCE211 (hereafter "211"). Other polymers in this series known to be useful in wallboard include PCE111. PCE211-Type dispersants are described more fully in U.S. Ser. No. 11/451,625, by Degussa Construction Polymers entitled "Polyether-Containing Copolymer", and U.S. Ser. No. 11/152,678 entitled "Polyether-Containing Copolymer", filed Jun. 14, 2005, both of which are herein incorporated by reference.

The molecular weight of the PCE211 Type dispersant is preferably from about 20,000 to about 60,000 Daltons. Surprisingly, it has been found that the lower molecular weight dispersants cause less retardation of set time than dispersants having a molecular weight greater than 60,000 Daltons. Generally longer side chain length, which results in an increase in overall molecular weight, provides better dispersability. However, tests with gypsum indicate that efficacy of the dispersant is reduced at molecular weights above 50,000 Daltons.

$R^1$ preferably makes up from about 30 to about 99 mole % of the total repeating units, more preferably from about 40 to about 80%. From about 1 to about 70 mole % of the repeating units are $R^2$, more preferably from about 10 to about 60 mole %.

Another class of polycarboxylate compounds that are useful in this invention is disclosed in U.S. Pat. No. 6,777,517, herein incorporated by reference and hereafter referenced as the "2641-Type Dispersant". Preferably, the dispersant includes at least three repeating units shown in Formula IV(a), IV(b) and IV(c).

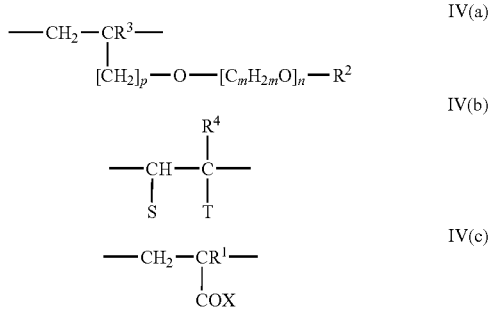

In this case, both acrylic and maleic acid repeating units are present, yielding a higher ratio of acid groups to vinyl ether groups. $R^1$ represents a hydrogen atom or an aliphatic hydrocarbon radical having from 1 to 20 carbon atoms. X represents OM, where M is a hydrogen atom, a monovalent metal cation, an ammonium ion or an organic amine radical. $R^2$ can be hydrogen, an aliphatic hydrocarbon radical having from 1 to 20 carbon atoms, a cycloaliphatic hydrocarbon radical having from 6 to 14 carbon atoms, which may be substituted. $R^3$ is hydrogen or an aliphatic hydrocarbon radical having from 1 to 5 carbon atoms, which are optionally linear or branched, saturated or unsaturated. $R^4$ is hydrogen or a methyl group, depending on whether the structural units are acrylic or methacrylic. P can be from 0 to 3. M is an integer from 2 to 4, inclusive, and n is an integer from 0 to 200, inclusive. PCE211-Type and 2641-Type dispersants are manufactured by Degussa Construction Polymers, GmbH (Tröstberg, Germany) and marketed in the United States by Degussa Corp. (Kennesaw, Ga.). Preferred 2641-Type Dispersants are sold by Degussa as MELFLUX 2641F, MELFLUX 2651F and MELFLUX 2500L dispersants. 2641-Type dispersants (MELFLUX is a registered trademark of Degussa Construction Polymers, GmbH) are described for use in wallboard and gypsum slurries in U.S. Ser. No. 11/152,661, entitled "Fast Drying Wallboard", previously incorporated by reference.

Yet another preferred dispersant family is sold by Degussa and referenced as "1641-Type Dispersants". This dispersant is more fully described in U.S. Pat. No. 5,798,425, herein incorporated by reference. A particularly preferred 1641-Type Dispersant is shown in Formula VI and marketed as MELFLUX 1641F dispersant by Degussa. This dispersant is made primarily of two repeating units, one a vinyl ether and the other a vinyl ester. In Formula V, m and n are the mole ratios of the component repeating units, which can be randomly positioned along the polymer chain.

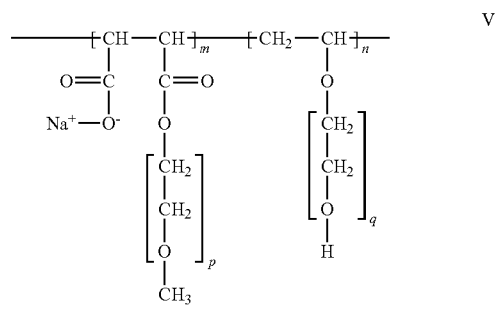

These dispersants are particularly well-suited for use with gypsum. While not wishing to be bound by theory, it is believed that the acid repeating units bind to the hemihydrate crystals while the long polyether chains of the second repeating unit perform the dispersing function. Since it is less retardive than other dispersants, it is less disruptive to the manufacturing process of gypsum products such as wallboard. The dispersant is used in any effective amount. To a large extent, the amount of dispersant selected is dependant on the desired fluidity of the slurry. As the amount of water decreases, more dispersant is required to maintain a constant slurry fluidity. Since polycarboxylate dispersants are relatively expensive components, it is preferred to use a small dose, preferably less than 2% or more preferably less than 1% by weight based on the weight of the dry stucco. Preferably, the dispersant is used in amounts of about 0.05% to about 0.5% based on the dry weight of the stucco. More preferably, the dispersant is used in amounts of about 0.01% to about 0.2% on the same basis. In measuring a liquid dispersant, only the polymer solids are considered in calculating the dosage of the dispersant, and the water from the dispersant is considered when a water/stucco ratio is calculated.

Many polymers can be made with the same repeating units using different distributions of them. The ratio of the acid-containing repeating units to the polyether-containing repeating unit is directly related to the charge density. Preferably, the charge density of the co-polymer is in the range of about 300 to about 3000 µequiv. charges/g co-polymer. It has been found that the most effective dispersant tested for water reduction in this class of dispersants, MELFLUX 2651F, has the highest charge density.

However, it has also been discovered that the increase in charge density further results in an increase in the retardive effect of the dispersant. Dispersants with a low charge density, such as MELFLUX 2500L, retard the set times less than the MELFLUX 2651F dispersant that has a high charge density. Since retardation in set times increases with the increase in efficacy obtained with dispersants of high charge density, making a slurry with low water, good flowability and reasonable set times requires maintaining the charge density in a mid-range. More preferably, the charge density of the co-polymer is in the range of about 600 to about 2000 µequiv. charges/g co-polymer.

The modifier can be any substance, liquid or solid, which when combined with a polycarboxylate dispersant in a gypsum slurry, leads to an improvement in the efficacy of the dispersant. Modifiers are not intended to be dispersants in themselves, but serve to allow the dispersant to be more effective. For example, at constant concentrations of dispersant, better fluidity is obtained when the modifier is used compared to the same slurry without the modifier.

Although the exact chemistry involved in the use of modifiers is not fully understood, at least two different mechanisms are responsible for the increase in dispersant efficacy. Lime, for example, reacts with the polycarboxylate in the aqueous solution to uncoil the dispersant molecule. In contrast, soda ash reacts on the gypsum surface to help improve the dispersant effect. Any mechanism can be used by the modifier to improve the efficacy of the dispersant for the purposes of this invention. Theoretically, if the two mechanisms work independently, combinations of modifiers can be found that utilize the full effect of both mechanisms and result in even better dispersant efficacy.

Preferred modifiers include cement; lime, also known as quicklime or calcium oxide; slaked lime, also known as calcium hydroxide; soda ash, also known as sodium carbonate; potassium carbonate, also known as potash; and other carbonates, silicates, hydroxides, phosphonates and phosphates. Preferred carbonates include sodium and potassium carbonate. Sodium silicate is a preferred silicate.

When lime or slaked lime is used as the modifier, it is used in concentrations of about 0.15% to about 1.0% based on the weight of the dry calcium sulfate hemihydrate. In the presence of water, lime is quickly converted to calcium hydroxide, or slaked lime, and the pH of the slurry becomes alkaline. The sharp rise in pH can cause a number of changes in the slurry chemistry. Certain additives, including trimetaphosphate, break down as the pH increases. There can also be problems with hydration and, where the slurry is used to make wallboard or gypsum panels, there are problems with paper bond at high pH. For workers who come in contact with the slurry, strongly alkaline compositions can be irritating to the skin and contact should be avoided. Above pH of about 11.5, lime no longer causes an increase in fluidity. Therefore, it is preferred in some applications to hold the pH below about nine for maximum performance from this modifier. In other applications, such as flooring, a high pH has the benefit of minimizing mold and mildew. Alkali metal hydroxides, especially sodium and potassium hydroxides are preferred for use in flooring.

Other preferred modifiers include carbonates, phosphonates, phosphates and silicates. Preferably, the modifiers are used in amounts less than 0.25% based on the weight of the dry calcium sulfate hemihydrate. Above these concentrations, increases in the amount of modifier causes a decrease in the dispersant efficacy. These modifiers are preferably used in amounts of from about 0.05 to about 0.2 weight %.

The charge density of the dispersant has also been found to affect the ability of the modifier to interact with the dispersant. Given a family of dispersants with the same repeating units, the modifier causes a greater increase in efficacy in the dispersant having the higher charge density. It is important to note that although the general trend is to obtain a higher efficacy boost with higher charge density, when comparing the effectiveness of dispersants having different repeating units, the effectiveness of the dispersants may be considerably different at the same charge density. Thus, adjustment of the charge density may not be able to overcome poor fluidity with a particular family of dispersants for that application.

Modifiers appear to be less effective if the calcium sulfate hemihydrate is wetted with the dispersant before the modifier is added to the mixture. It is, therefore, preferred that the dispersant and the modifier be combined prior to mixture with the stucco. If either the modifier or the dispersant is in a liquid form, the liquid is preferably added to the process water. The other of the modifier or the dispersant is then added to the water prior to addition of the calcium sulfate hemihydrate. Only a few seconds of mixing is needed to blend the modifier and the dispersant together. If both the modifier and the dispersant are in dry form, they can be mixed together and added simultaneously with the stucco. The preferred method of combining water, dispersant, modifier and stucco is further described in U.S. Ser. No. 11/152,323, entitled "Method of Making a Gypsum Slurry with Modifiers and Dispersants", previously incorporated by reference.

It has also been noted that the polycarboxylate dispersants and the modifiers react differently when used in different gypsum media. While not wishing to be bound by theory, the impurities present in gypsum are believed to contribute to the efficacy of both the dispersant and the modifier. Among the impurities present in stucco are salts that vary by geographical location. Many salts are known to be set accelerators or set retarders. These same salts may also change the efficacy of the polycarboxylate dispersant by affecting the degree of fluidity that can be achieved. Some preferred polycarboxylates, including the PCE211-Type Dispersants, are best utilized with a low salt stucco. Other dispersants, such as the 2641-Type Dispersants are suitable for use with high-salt stuccos.

As a result of the use of fluidity enhancing dispersants and modifiers to boost their performance, the amount of water used to fluidize the slurry can be reduced compared to slurries made without these additives. It must be understood that the stucco source, the calcining technique, the dispersant family, the charge density and the modifier all work together to produce a slurry of a given fluidity. In the laboratory, it is possible to reduce the water level close to that theoretically required to fully hydrate the calcium sulfate hemihydrate. When used in a commercial setting, process considerations may not allow water reduction to this degree.

Any amount of water may be used to make the slurry of this invention as long as the slurry has sufficient fluidity for the application being considered. The amount of water varies greatly, depending on the source of the stucco, how it is calcined, the additives and the product being made. For wallboard applications, a water to stucco ratio ("WSR") of 0.18 to about 0.8 is used, preferably from about 0.2 to about 0.5. Pourable flooring utilizes a WSR of from about 0.17 to about 0.45, preferably from 0.17 to about 0.34. Flooring compositions using this dispersant are revealed in U.S. Ser. No. 11/152,324, entitled "High Strength Flooring Compositions", previously incorporated by reference, that utilize water to stucco ratios less than 0.3. Castable products utilize a WSR from about 0.1 to about 0.3, preferably-from about 0.16 to about 0.25. In the laboratory, water to stucco ratios of less than 0.1 are attainable, however, commercially, the water to stucco ratio is typically from 0.5 to 0.7. Generally, water to stucco ratios of about 0.2 to about 0.6 are preferred. The amount of water can be diminished compared to other slurries, resulting in fuel savings and higher product strength.

In a second aspect of this invention, the slurry is used to make gypsum panels or wallboard having increased strength. To form gypsum panels, the slurry is poured onto at least one sheet of facing material. Facing materials are well known to an artisan of gypsum panels. Multi-ply paper is the preferred facing material, however, single-ply paper, cardboard, plastic sheeting and other facing materials may be used.

Other additives are also added to the slurry as are typical for the particular application to which the gypsum slurry will be put. Set retarders (up to about 2 lbs./MSF (9.8 g/m$^2$)) or dry accelerators (up to about 35 lbs./MSF (170 g/m$^2$)) are added to modify the rate at which the hydration reactions take place. "CSA" is a set accelerator comprising 95% calcium sulfate dihydrate co-ground with 5% sugar and heated to 250° F. (121° C.) to caramelize the sugar. CSA is available from USG Corporation, Southard, Okla. plant, and is made according to U.S. Pat. No. 3,573,947, herein incorporated by reference. Potassium sulfate is another preferred accelerator. HRA is calcium sulfate dihydrate freshly ground with sugar at a ratio of about 5 to 25 pounds of sugar per 100 pounds of calcium sulfate dihydrate. It is further described in U.S. Pat. No. 2,078,199, herein incorporated by reference. Both of these are preferred accelerators.

Another accelerator, known as wet gypsum accelerator or WGA, is also a preferred accelerator. A description of the use of and a method for making wet gypsum accelerator are disclosed in U.S. Pat. No. 6,409,825, herein incorporated by reference. This accelerator includes at least one additive selected from the group consisting of an organic phosphonic compound, a phosphate-containing compound or mixtures thereof. This particular accelerator exhibits substantial longevity and maintains its effectiveness over time such that the wet gypsum accelerator can be made, stored, and even transported over long distances prior to use. The wet gypsum accelerator is used in amounts ranging from about 5 to about 80 pounds per thousand square feet (24.3 to 390 g/m$^2$) of board product.

In some embodiments of the invention, additives are included in the gypsum slurry to modify one or more properties of the final product. Additives are used in the manner and amounts as are known in the art. Concentrations are reported in amounts per 1000 square feet of finished board panels ("MSF"). Starches are used in amounts from about 3 to about 20 lbs./MSF (14.6 to 97.6 g/m$^2$) to increase the density and strengthen the product. Glass fibers are optionally added to the slurry in amounts of at least 11 lbs./MSF (54 g/m$^2$). Up to 15 lbs./MSF (73.2 g/m$^2$) of paper fibers are also added to the slurry. Wax emulsions are added to the gypsum slurry in amounts up to 90 lbs./MSF (0.4 kg/m$^2$) to improve the water-resistency of the finished gypsum board panel.

In embodiments of the invention that employ a foaming agent to yield voids in the set gypsum-containing product to provide lighter weight, any of the conventional foaming agents known to be useful in preparing foamed set gypsum products can be employed. Many such foaming agents are well known and readily available commercially, e.g. from GEO Specialty Chemicals, Ambler, Pa. Foams and a preferred method for preparing foamed gypsum products are disclosed in U.S. Pat. No. 5,683,635, herein incorporated by reference. If foam is added to the product, the polycarboxylate dispersant can be divided between the process water and the foam water prior to its addition to the calcium sulfate hemihydrate. A preferred method of incorporating one or more dispersants into the mixer water and the foam water is disclosed in U.S. Ser. No. 11/152,404, entitled, "Effective Use of Dispersants in Wallboard Containing Foam", previously incorporated by reference.

A trimetaphosphate compound is added to the gypsum slurry in some embodiments to enhance the strength of the product and to reduce sag resistance of the set gypsum. Preferably the concentration of the trimetaphosphate compound is from about 0.07% to about 2.0% based on the weight of the calcined gypsum. Gypsum compositions including trimetaphosphate compounds are disclosed in U.S. Pat. Nos. 6,342,284 and 6,632,550, both herein incorporated by reference. Exemplary trimetaphosphate salts include sodium, potassium or lithium salts of trimetaphosphate, such as those available from Astaris, LLC., St. Louis, Mo. Care must be exercised when using trimetaphosphate with lime or other modifiers that raise the alkalinity of the slurry. Above a pH of about 9.5, the trimetaphosphate loses its ability to strengthen the product and the slurry becomes severely retardive.

Other potential additives to the wallboard are biocides to reduce growth of mold, mildew or fungi. Depending on the biocide selected and the intended use for the wallboard, the biocide can be added to the covering, the gypsum core or both. Examples of biocides include boric acid, pyrithione salts and copper salts. Biocides can be added to either the facing or the gypsum core. When used, biocides are used in the facings in amounts of less than about 500 ppm.

In addition, the gypsum composition optionally can include a starch, such as a pregelatinized starch and/or an acid-modified starch. The inclusion of the pregelatinized starch increases the strength of the set and dried gypsum cast and minimizes or avoids the risk of paper delamination under conditions of increased moisture (e.g., with regard to elevated ratios of water to calcined gypsum). One of ordinary skill in the art will appreciate methods of pregelatinizing raw starch, such as, for example, cooking raw starch in water at temperatures of at least about 185° F. (85° C.) or other methods. Suitable examples of pregelatinized starch include, but are not limited to, PCF 1000 starch, commercially available from Lauhoff Grain Company and AMERIKOR 818 and HQM PREGEL starches, both commercially available from Archer Daniels Midland Company. If included, the pregelatinized starch is present in any suitable amount. For example, if included, the pregelatinized starch can be added to the mixture used to form the set gypsum composition such that it is present in an amount of from about 0.5% to about 10% percent by weight of the set gypsum composition. Starches such as USG95 (United States Gypsum Company, Chicago, Ill.) are also optionally added for core strength.

Other known additives may be used as needed to modify specific properties of the product. Sugars, such as dextrose, are used to improve the paper bond at the ends of the boards. Wax emulsions or polysiloxanes are used for water resistance. If stiffness is needed, boric acid is commonly added.

Fire retardancy can be improved by the addition of vermiculite. These and other known additives are useful in the present slurry and wallboard formulations.

While individual gypsum panels can be made in a batch process, in a preferred process, gypsum board is made in a continuous process formed into a long panel and cut into panels of desired lengths. The formed facing material is obtained and put into place to receive the gypsum slurry. Preferably, the facing material is of a width to form a continuous length of panel that requires no more than two cuts to make a panel with the desired finished dimensions. Any known facing material is useful in making the wallboard panels, including paper, glass mat and plastic sheeting. Facing material is continuously fed to the board line.

The slurry is formed by mixing the dry components and the wet components together in any order. Typically, liquid additives are added to the water, and the mixer is activated for a short time to blend them. Water is measured directly into the mixer. If modifiers are used, preferably the modifiers and dispersants are predissolved in the mixer water prior to introduction of the stucco. Dry components of the slurry, the calcined gypsum and any dry additives, are preferably blended together prior to entering the mixer. The dry components are added to the liquid in the mixer, and blended until the dry components are moistened.

The slurry is then mixed to achieve a homogeneous slurry. Usually, an aqueous foam is mixed into the slurry to control the density of the resultant core material. Such an aqueous foam is usually generated by high shear mixing of an appropriate foaming agent, water and air, prior to the introduction of the resultant foam into the slurry. The foam can be inserted into the slurry in the mixer, or preferably, into the slurry as it exits the mixer in a discharge conduit. See, for example, U.S. Pat. No. 5,683,635, herein incorporated by reference. In a gypsum board plant, frequently solids and liquids are continuously added to a mixer, while the resultant slurry is continuously discharged from the mixer, and has an average residence time in the mixer of less than 30 seconds.

The slurry is continuously dispensed through one or more outlets from the mixer through a discharge conduit and deposited onto a moving conveyor carrying the facing material and formed into a panel. Another paper cover sheet is optionally placed on top of the slurry, so that the slurry is sandwiched between two moving cover sheets which become the facings of the resultant gypsum panel. The thickness of the resultant board is controlled by a forming plate, and the edges of the board are formed by appropriate mechanical devices which continuously score, fold and glue the overlapping edges of the paper. Additional guides maintain thickness and width as the setting slurry travels on a moving belt. While the shape is maintained, the calcined gypsum is kept under conditions sufficient (i.e. temperature of less than about 120° F.) to react with a portion of the water to set and form an interlocking matrix of gypsum crystals. The board panels are then cut, trimmed and passed to dryers to dry the set but still somewhat wet boards.

Preferably, a two-stage drying process is employed. The panels are first subjected to a high temperature kiln to rapidly heat up the board and begin to drive off excess water. The temperature of the kiln and the residence time of the board vary with the thickness of the panel. By way of example, a ½-inch board (12.7 mm) is preferably dried at temperatures in excess of 300° F. (149° C.) for approximately 20 to 50 minutes. As water at the surface evaporates, it is drawn by capillary action from the interior of the panel to replace the surface water. The relatively rapid water movement assists migration of the starch and the pyrithione salt into the paper. A second-stage oven has temperatures less than 300° F. (149° C.) to limit calcination of the board.

EXAMPLE 1

Tests were conducted to determine the effect of the addition of potassium carbonate on two different dispersants. In each of the following samples, a gypsum slurry was made from 400 grams of stucco from Southard, Okla., 180 grams of water and 0.2% dispersant based on the dry weight of the stucco. The dispersant type and amount of potassium carbonate are shown in Table I below, together with the results of the patty size and the stiffening rate tests.

TABLE I

| Dispersant | Potassium Carbonate, g | Patty Size, cm | Stiffening Time |
|---|---|---|---|
| 211 | 0.6 | 30.3 | 6:00 |
| 211 | 0.0 | 19.8 | 2:05 |
| Melflux 2500L | 0.6 | 26.0 | 10:30 |
| Melflux 2500L | 0.0 | 15.5 | 2:35 |

As is seen in the data in Table I above, the addition of potassium carbonate increases the slurry fluidity as evidenced by the increased patty size. The modifier addition also retarded the stiffening time compared to the samples where no potassium carbonate was used.

EXAMPLE 2

Tests were run to determine the effect of lime on dispersant MELFLUX 2500L with two different stuccos.

TABLE II

| | | Water to Stucco Ratio at Given Dispersant Dose | | | |
|---|---|---|---|---|---|
| Stucco | Lime | 0.0% | 0.05% | 0.11% | 0.22% |
| Shoals | 0 | 0.65 | 0.64 | 0.58 | 0.50 |
| Shoals | 0.25% | 0.68 | 0.61 | 0.52 | 0.41 |
| Galena | 0 | 0.60 | 0.53 | 0.45 | 0.39 |
| Galena | 0.25% | 0.64 | 0.50 | 0.39 | 0.30 |

Tests presented above show that lime is an effective modifier with stuccos from Shoals and Galena Park.

EXAMPLE 3

Soda ash was tested in the laboratory for suitability as a modifier. The amount of water listed in Table III, the water demand, was added to 50 cc of board stucco, a beta-calcined hemihydrate. This amount of water was selected to produce a standard 3¾" patty when the stucco, dispersant, modifier and water were combined. The dispersant was added at the rate of 1.5#lbs./MSF on a solids basis as if it were being added to the slurry for a ½" wallboard. The dispersant was a PCE211, two-repeating unit dispersant, identified as PCE49.

Sodium carbonate was added at the concentrations shown in Table III, ranging from none to 0.6% by weight based on the weight of the dry stucco. The water demand and the set time are shown in Table III.

TABLE III

| Na$_2$CO$_3$ | cc Water Added | Set Time |
| --- | --- | --- |
| 0.0% | 52 | 17 |
| 0.05% | 47 | 17 |
| 0.10% | 45 | 17 |
| 0.20% | 45 | 15 |
| 0.40% | 47 | 11 |
| 0.60% | 50 | 11 |

Up to and including, 0.2%, the amount of water needed to make a patty of standard diameter decreases as the amount of the modifier increases. At 0.40% and 0.60% levels, the water demand again rises. The set time consistently drops as the amount of soda ash increases.

EXAMPLE 4

A similar study was conducted, except that CaMg(OH)$_4$ was used as the modifier. Water was added in the amounts reported in Table IV. The same stucco and dispersant were used in the same amounts.

TABLE IV

| CaMg(OH)$_4$ | cc Water Added | Set Time |
| --- | --- | --- |
| 0.0% | 52 | 17 |
| 0.05% | 48 | 13 |
| 0.10% | 47 | 11 |
| 0.20% | 45 | 11 |
| 0.40% | 44.5 | 11 |
| 0.60% | 45 | 9 |

Hydroxides act as modifiers, allowing less water to be used to obtain a standard fluidity which produces a standard patty size. Although the efficacy is good, hydroxides are not suitable for 15 some products, such as wallboard, because the slurry becomes very alkaline, causing loss of efficacy of some preferred additives, including trimetaphosphate. Even at 0.05% CaMg(OH)$_4$, the pH was above 10. For products where pH of the product is not a problem, hydroxides can be used effectively as modifiers.

EXAMPLE 5

The preferred 211 dispersant was tested with a variety of modifiers to determine the improvement in efficacy. Reagent grade tetra sodium phosphate ("TSP"), tetra sodium pyrophosphate ("TSPP") and sodium carbonate (soda ash) were tested. Dequest 2006 (Solutia, Inc. St. Louis, Mo.), a penta sodium salt of aminotri (methylene phosphonic acid), was also tested.

For all testing samples, the water to stucco ratio was 0.5. Wet gypsum accelerator (WGA) was based on the dry weight of the stucco was added. The control sample had only 0.5% by weight WGA. The amount of each modifier added is shown in Table V, along with the set time and patty size produced by each sample.

The modifier and dispersant were added to the water, followed by addition of the stucco and WGA. The slurry was stirred until it was consistent.

TABLE V

| Modifier | Control | DEQUEST 2006 | TSP | TSPP | Soda Ash |
| --- | --- | --- | --- | --- | --- |
| Amount | 0 | 0.05% | 0.05% | 0.05% | 0.15% |
| Patty Size | 20 cm | 23.7 cm | 21.5 cm | 25.5 cm | 27.5 cm |
| Stiffening Time | 2:15 | 2:35 | 2:15 | 2:55 | 2:30 |

Even though more soda ash was used to obtain these results, it is considered to be effective because it costs one third the price of the other modifiers. Further, it increases the patty size by 37% while increasing the set time only 11%. DEQUEST 2006 yields a much smaller patty for about the same set time and TSPP has a smaller patty size but has a higher set time.

While a particular embodiment of the modifiers for gypsum products, is described, it will be appreciated by those skilled in the art that changes and modifications may be made thereto without departing from the invention in its broader aspects and as set forth in the following claims.

What is claimed is:

1. A gypsum panel comprising
   at least one facing material; and
   a gypsum core comprising a hydrated gypsum slurry, said slurry comprising:
      water;
      calcined gypsum;
      a polycarboxylate dispersant; and
      at least one modifier chemically configured to increase the efficacy of said polycarboxylate dispersant.

2. The gypsum panel of claim 1 wherein said modifier is selected from the group consisting of lime, soda ash, carbonates, silicates, phosphates, cement and combinations thereof.

3. The gypsum panel of claim 1 wherein said modifier is soda ash.

4. The gypsum panel of claim 1 wherein said modifier is present in concentrations of about 0.05% to about 0.25% by weight based on the dry weight of said calcined gypsum.

5. The gypsum panel of claim 1 wherein said polycarboxylate dispersant comprises a polyether repeating unit and at least one of acrylic acid, methacrylic acid and maleic acid repeating units.

6. The gypsum panel of claim 1 wherein said polycarboxylate dispersant has a charge density ratio of about 5 to about 8.

7. The gypsum panel of claim 1 wherein said polycarboxylate dispersant is present in amounts of about 0.05% to about 0.5% based on the dry weight of said calcined gypsum.

8. The gypsum panel of claim 1 wherein said water is present in amounts of about 0.5 to about 0.6 based on the dry weight of said calcined gypsum.

* * * * *